US008823854B2

(12) United States Patent
Yoshida

(10) Patent No.: US 8,823,854 B2
(45) Date of Patent: Sep. 2, 2014

(54) IMAGING DEVICE AND IMAGING CONTROL METHOD FOR READING AND DISPLAYING IMAGE DATA DURING EXPOSURE

(75) Inventor: Akihiro Yoshida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 12/913,382

(22) Filed: Oct. 27, 2010

(65) Prior Publication Data

US 2011/0109778 A1    May 12, 2011

(30) Foreign Application Priority Data

Nov. 10, 2009   (JP) ................. 2009-256601

(51) Int. Cl.
*H04N 5/222* (2006.01)
*H04N 5/235* (2006.01)
*H04N 5/232* (2006.01)
*H04N 5/335* (2011.01)

(52) U.S. Cl.
CPC ......... *H04N 5/23293* (2013.01); *H04N 5/2353* (2013.01)
USPC ................ 348/333.01; 348/208.1; 348/345

(58) Field of Classification Search
USPC ............. 348/208.1, 208.12, 221.1, 297, 366, 348/371
See application file for complete search history.

(56) References Cited

U.S. PATENT DOCUMENTS

| 6,982,750 B1 | 1/2006 | Yoshida et al. |
| 7,046,275 B1* | 5/2006 | Yamada et al. ............ 348/220.1 |
| 7,180,543 B2 | 2/2007 | Ojima et al. |
| 7,187,409 B2 | 3/2007 | Nakahira et al. |
| 7,307,662 B2 | 12/2007 | Yoshida et al. |
| 7,656,457 B2 | 2/2010 | Ojima et al. |
| 7,697,057 B2 | 4/2010 | Yoshida |
| 2003/0081124 A1* | 5/2003 | Balasubrawmanian et al. .............................. 348/180 |
| 2004/0150738 A1* | 8/2004 | Sakimoto et al. ........ 348/333.11 |
| 2004/0169766 A1 | 9/2004 | Yoshida |
| 2004/0239795 A1* | 12/2004 | Kitajima ........................ 348/362 |
| 2006/0133769 A1* | 6/2006 | Toji et al. ........................ 386/52 |
| 2007/0212055 A1 | 9/2007 | Yoshida |
| 2007/0230939 A1* | 10/2007 | Tanaka et al. ................. 396/155 |
| 2008/0084487 A1 | 4/2008 | Yoshida |
| 2008/0199150 A1* | 8/2008 | Candelore ....................... 386/95 |
| 2009/0047010 A1 | 2/2009 | Yoshida et al. |
| 2009/0135295 A1* | 5/2009 | Kunishige et al. ............ 348/362 |
| 2009/0167905 A1* | 7/2009 | Ishibashi et al. .............. 348/241 |
| 2009/0213239 A1 | 8/2009 | Yoshida |
| 2010/0079616 A1 | 4/2010 | Minakuti |

FOREIGN PATENT DOCUMENTS

| JP | 2002-27326 | 1/2002 |
| JP | 2004-235973 A | 8/2004 |
| JP | 2005-117395 | 4/2005 |
| JP | 2005-354166 | 12/2005 |
| JP | 2008-306684 | 12/2008 |
| JP | 2009-130470 | 6/2009 |
| JP | 2010-81313 A | 4/2010 |

* cited by examiner

*Primary Examiner* — Hung Lam
(74) *Attorney, Agent, or Firm* — Oblon, Spivak, McClelland, Maier & Neustadt, L.L.P.

(57) ABSTRACT

An imaging device includes an optical imaging system, a solid-state image sensor which converts an optical image of a subject formed by the optical imaging system into an electric image signal, an exposure controller which starts an exposure in response to an instruction to start shooting, an image reader which sequentially read image signals from the solid-state image sensor while the exposure controller continues the exposure, an image processor which sequentially processes the image signals read by the image reader, a display unit which displays image data output from the image processor; and an image display processor which allows the display unit to sequentially display image data processed by the image processor with a predetermined time interval.

13 Claims, 17 Drawing Sheets

FIG. 5

| FIRST TIME INTERVAL [SEC] | | EXPOSURE TIME [SEC] | | SECOND TIME INTERVAL [SEC] | | DISPLAY UPDATE TIME [SEC] | |
|---|---|---|---|---|---|---|---|
| | | t0 | 0.00 | | | T0 | 0.00 |
| Δt1 | 1.00 | t1 | 1.00 | ΔT1 | 2.00 | T1 | 2.00 |
| Δt2 | 0.26 | t2 | 1.26 | ΔT2 | 2.00 | T2 | 4.00 |
| Δt3 | 0.33 | t3 | 1.59 | ΔT3 | 2.00 | T3 | 6.00 |
| Δt4 | 0.41 | t4 | 2.00 | ΔT4 | 2.00 | T4 | 8.00 |
| Δt5 | 0.52 | t5 | 2.52 | ΔT5 | 2.00 | T5 | 10.00 |
| Δt6 | 0.65 | t6 | 3.17 | ΔT6 | 2.00 | T6 | 12.00 |
| Δt7 | 0.83 | t7 | 4.00 | ΔT7 | 2.00 | T7 | 14.00 |
| Δt8 | 1.04 | t8 | 5.04 | ΔT8 | 2.00 | T8 | 16.00 |
| Δt9 | 1.31 | t9 | 6.35 | ΔT9 | 2.00 | T9 | 18.00 |
| Δt10 | 1.65 | t10 | 8.00 | ΔT10 | 2.00 | T10 | 20.00 |
| Δt11 | 2.08 | t11 | 10.08 | ΔT11 | 2.00 | T11 | 22.00 |
| Δt12 | 2.62 | t12 | 12.70 | ΔT12 | 2.00 | T12 | 24.00 |
| Δt13 | 3.30 | t13 | 16.00 | ΔT13 | 2.00 | T13 | 26.00 |
| Δt14 | 4.16 | t14 | 20.16 | ΔT14 | 2.00 | T14 | 28.00 |
| Δt15 | 5.24 | t15 | 25.40 | ΔT15 | 2.00 | T15 | 30.00 |
| Δt16 | 6.60 | t16 | 32.00 | ΔT16 | 2.00 | T16 | 32.00 |
| Δt17 | 8.32 | t17 | 40.32 | ΔT17 | 2.00 | T17 | 34.00 |
| Δt18 | 10.48 | t18 | 50.80 | ΔT18 | 2.00 | T18 | 36.00 |
| Δt19 | 13.20 | t19 | 64.00 | ΔT19 | 2.00 | T19 | 38.00 |
| Δt20 | 16.63 | t20 | 80.63 | ΔT20 | 2.00 | T20 | 40.00 |
| Δt21 | 20.96 | t21 | 101.59 | ΔT21 | 2.00 | T21 | 42.00 |
| Δt22 | 26.41 | t22 | 128.00 | ΔT22 | 2.00 | T22 | 44.00 |
| Δt23 | 33.27 | t23 | 161.27 | ΔT23 | 2.00 | T23 | 46.00 |
| Δt24 | 41.92 | t24 | 203.19 | ΔT24 | 2.00 | T24 | 48.00 |
| Δt25 | 52.81 | t25 | 256.00 | ΔT25 | 2.00 | T25 | 50.00 |

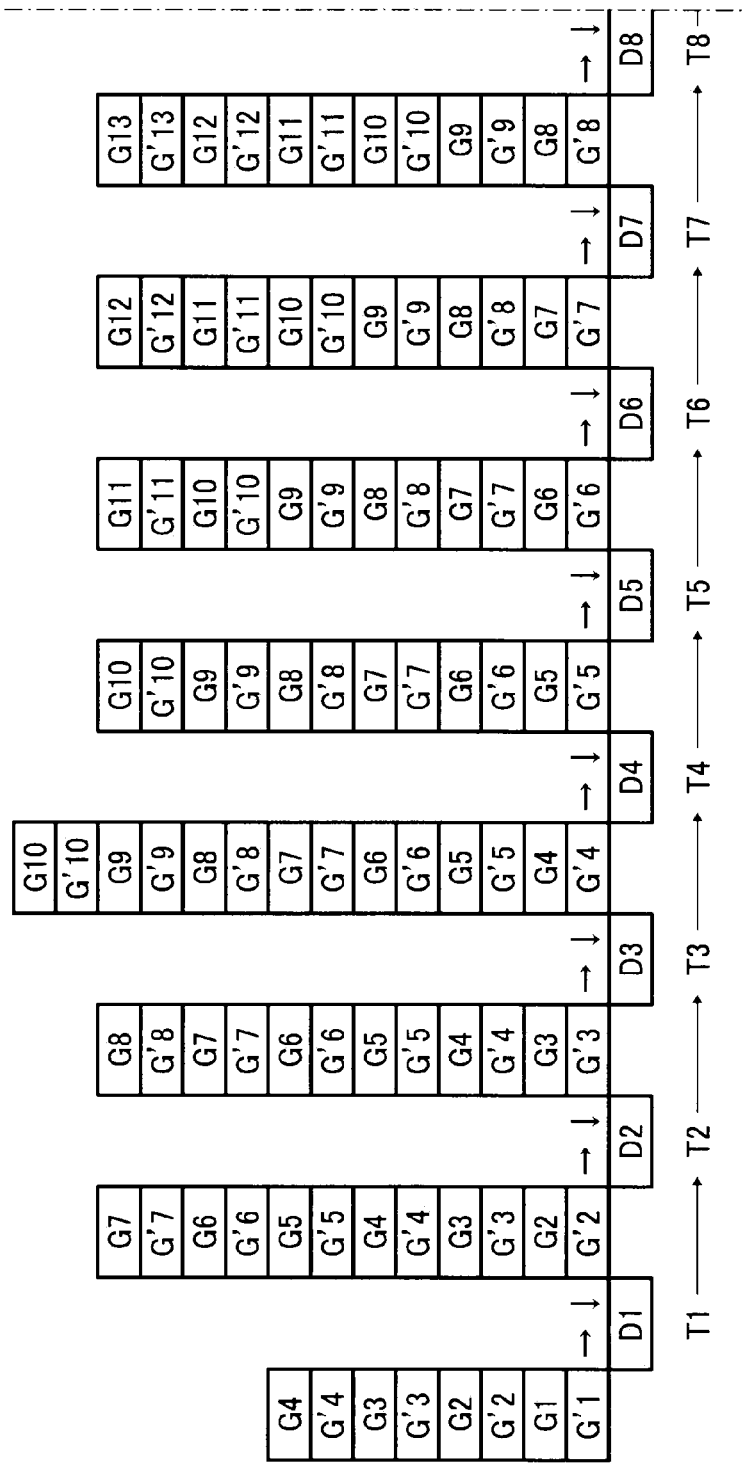

FIG. 11

| FIRST TIME INTERVAL [SEC] | | EXPOSURE TIME [SEC] | | SECOND TIME INTERVAL [SEC] | | DISPLAY UPDATE TIME [SEC] | |
|---|---|---|---|---|---|---|---|
| Δt1 | 1.00 | t0 | 0.00 | | | | |
| Δt2 | 0.26 | t1 | 1.00 | | | | |
| Δt3 | 0.33 | t2 | 1.26 | | | | |
| Δt4 | 0.41 | t3 | 1.59 | | | | |
| Δt5 | 0.52 | t4 | 2.00 | | | | |
| Δt6 | 0.65 | t5 | 2.52 | | | | |
| Δt7 | 0.83 | t6 | 3.17 | | | | |
| Δt8 | 1.04 | t7 | 4.00 | | | | |
| Δt9 | 1.31 | t8 | 5.04 | | | | |
| Δt10 | 1.65 | t9 | 6.35 | | | | (8.00) |
| Δt11 | 2.08 | t10 | 8.00 | ΔT11 | 2.00 | T11 | 10.00 |
| Δt12 | 2.62 | t11 | 10.08 | ΔT12 | 2.00 | T12 | 12.00 |
| Δt13 | 3.30 | t12 | 12.70 | ΔT13 | 2.00 | T13 | 14.00 |
| Δt14 | 4.16 | t13 | 16.00 | ΔT14 | 2.00 | T14 | 16.00 |
| Δt15 | 5.24 | t14 | 20.16 | ΔT15 | 2.00 | T15 | 18.00 |
| Δt16 | 6.60 | t15 | 25.40 | ΔT16 | 2.00 | T16 | 20.00 |
| Δt17 | 8.32 | t16 | 32.00 | ΔT17 | 2.00 | T17 | 22.00 |
| Δt18 | 10.48 | t17 | 40.32 | ΔT18 | 2.00 | T18 | 24.00 |
| Δt19 | 13.20 | t18 | 50.80 | ΔT19 | 2.00 | T19 | 26.00 |
| Δt20 | 16.63 | t19 | 64.00 | ΔT20 | 2.00 | T20 | 28.00 |
| Δt21 | 20.96 | t20 | 80.63 | ΔT21 | 2.00 | T21 | 30.00 |
| Δt22 | 26.41 | t21 | 101.59 | ΔT22 | 2.00 | T22 | 32.00 |
| Δt23 | 33.27 | t22 | 128.00 | ΔT23 | | T23 | |
| Δt24 | 41.92 | t23 | 161.27 | ΔT24 | | T24 | |
| Δt25 | 52.81 | t24 | 203.19 | ΔT25 | | T25 | |
| | | t25 | 256.00 | | | | |

PREDETERMINED PERIOD ELAPSED →

OFF OF SECOND RELEASE SWITCH DETECTED

FIG. 14

| FIRST TIME INTERVAL [SEC] | | EXPOSURE TIME [SEC] | | SECOND TIME INTERVAL [SEC] | | DISPLAY UPDATE TIME [SEC] | |
|---|---|---|---|---|---|---|---|
| | | t0 | 0.00 | | | T0 | 0.00 |
| Δt1 | 1.00 | t1 | 1.00 | ΔT1 | 2.00 | T1 | 2.00 |
| Δt2 | 0.26 | t2 | 1.26 | ΔT2 | 2.00 | T2 | 4.00 |
| Δt3 | 0.33 | t3 | 1.59 | ΔT3 | 2.00 | T3 | 6.00 |
| Δt4 | 0.41 | t4 | 2.00 | ΔT4 | 2.00 | T4 | 8.00 |
| Δt5 | 0.52 | t5 | 2.52 | ΔT5 | 2.00 | T5 | 10.00 |
| Δt6 | 0.65 | t6 | 3.17 | ΔT6 | 2.00 | T6 | 12.00 |
| Δt7 | 0.83 | t7 | 4.00 | ΔT7 | 2.00 | T7 | 14.00 |
| Δt8 | 1.04 | t8 | 5.04 | ΔT8 | 2.00 | T8 | 16.00 |
| Δt9 | 1.31 | t9 | 6.35 | ΔT9 | 2.00 | T9 | 18.00 |
| Δt10 | 1.65 | t10 | 8.00 | ΔT10 | 2.00 | T10 | 20.00 |
| Δt11 | 2.08 | t11 | 10.08 | ΔT11 | 2.00 | T11 | 22.00 |
| Δt12 | 2.62 | t12 | 12.70 | ΔT12 | 2.00 | T12 | 24.00 |
| Δt13 | 3.30 | t13 | 16.00 | ΔT13 | 2.00 | T13 | 26.00 |
| Δt14 | 4.16 | t14 | 20.16 | ΔT14 | 2.00 | T14 | 28.00 |
| Δt15 | 5.24 | t15 | 25.40 | ΔT15 | 2.00 | T15 | 30.00 |
| | | t16 | 32.00 | ΔT16 | 2.00 | T16 | 32.00 |
| | | t17 | 40.32 | ΔT17 | 2.00 | T17 | 34.00 |
| | | t18 | 50.80 | ΔT18 | 2.00 | T18 | 36.00 |
| | | t19 | 64.00 | ΔT19 | 2.00 | T19 | 38.00 |
| | | t20 | 80.63 | ΔT20 | 2.00 | T20 | 40.00 |
| | | t21 | 101.59 | ΔT21 | 2.00 | T21 | 42.00 |
| | | t22 | 128.00 | ΔT22 | 2.00 | T22 | 44.00 |
| | | t23 | 161.27 | ΔT23 | 2.00 | T23 | 46.00 |
| | | t24 | 203.19 | ΔT24 | 2.00 | T24 | 48.00 |
| | | t25 | 256.00 | ΔT25 | 2.00 | T25 | 50.00 |

PREDETERMINED PERIOD ELAPSED

OFF OF SECOND RELEASE SWITCH DETECTED

IMAGING DEVICE AND IMAGING CONTROL METHOD FOR READING AND DISPLAYING IMAGE DATA DURING EXPOSURE

CROSS REFERENCE TO RELATED APPLICATION

The present application is based on and claims priority from Japanese Patent Application No. 2009-256601, filed on Nov. 10, 2009, the disclosure of which is hereby incorporated by reference in its entirety.

BACKGROUND OF THE INVENTION

1. Field of the Invention

The present invention relates to an imaging device such as a digital camera including a solid-state image sensor to acquire image data of a subject, in particular to an imaging device which performs good imaging control in a bulb mode and an imaging control method for such an imaging device.

2. Description of the Prior Art

In prior art there is a digital camera having a bulb mode in which a photo is taken in a long exposure time while a shutter is kept open (disclosed in Japanese Patent Application Publication No. 2002-27326 (Reference 1), for example). Such a digital camera has the same problem as a silver-salt camera that an operator cannot check a change in exposure amount on a display during the exposure to determine the right shooting timing with an intended exposure level. This requires for the operator to estimate an exposure time from his/her experience and check a reproduced image on a display. In a case that the image is not a successful shot, he/she has to re-take a photo.

In order to deal with such a problem, Japanese Patent Application Publication No. 2005-117395 (Reference 2), No. 2005-354166 (Reference 3), and No. 2009-130470 (Reference 4) disclose imaging devices which allow users to check a change in the exposure amount on a display by repetitively reading image data at a predetermined interval during exposure and adding a previously read frame and a currently read frame to update an image display.

Specifically, Reference 1 discloses a technique to display live preview images using a rolling shutter of a CMOS (complementary metal-oxide semiconductor) sensor. References 2 to 4 disclose imaging devices which display preview images in a bulb mode.

Recently, use of the CMOS sensor in an imaging device as described in Reference 1 has increased owing to a high resolution thereof, replacing a widely used CCD (charge coupled device). With use of the CCD, incident light need be blocked with a mechanical shutter during a transfer period even in the bulb mode. This leads to a problem that data of a subject is missed out during transfer periods which are repeated with a predetermined interval. For example, when capturing a moving subject such as fireworks, a captured image will be discrete trails. With use of another drive system instead of the mechanical shutter for the purpose of avoiding such a problem, a different problem as occurrence of smears arises.

In contrast, the rolling shutter of the CMOS image sensor can read image data with high resolution without transfer periods and it does not generate smears. Although the CMOS image sensor has an intrinsic drawback that an image of a moving subject may be distorted due to non-simultaneous exposure of the rolling shutter and transverse stripes may occur in a single image under flickering lights, these do not cause deterioration in image quality in the bulb mode in which exposure time is expected to be over 1 second.

Any of the above imaging devices cannot provide sufficient usability in bulb shooting and there is a demand for improving preview display in the bulb mode.

In the bulb shooting, exposure amount logarithmically rises relative to exposure time. Because of this, immediately after start of exposure, the exposure amount sharply rises and thereafter it gradually rises. In shooting a subject which takes about several seconds to reach an intended exposure amount, an operator needs to quickly decide the timing to complete the bulb exposure, following the sharp rise of the exposure amount while checking a change in the exposure amount on the display. On the other hand, in shooting a subject which takes over several dozen seconds to reach an intended exposure amount, an operator has to wait for the exposure amount to gradually rise to the intended amount.

There is one way to solve the above problem with the bulb mode that display update interval is set independently from data read interval during exposure. For instance, it is possible to reduce a change in the rising speed of the exposure amount on the display by updating image display with a longer interval when the rise in the exposure amount is sharp and updating it with a shorter interval when the rise in the exposure amount is gradual.

SUMMARY OF THE INVENTION

The present invention aims to provide an imaging device which updates an image on a display with a gradual change in the exposure amount with a constant time interval even when the exposure amount abruptly changes in reality by making an image display process independent from an image capturing process. This enables an operator to easily decide the right timing to complete the bulb exposure. The present invention also aims to provide an imaging control method for such an imaging device.

According to one aspect of the present invention, an imaging device comprises an optical imaging system; a solid-state image sensor which converts an optical image of a subject formed by the optical imaging system into an electric image signal; an exposure controller which starts an exposure in response to an instruction to start shooting; an image reader which sequentially reads image signals from the solid-state image sensor while the exposure controller continues the exposure; an image processor which sequentially processes the image signals read by the image reader; a display unit which displays image data output from the image processor; and an image display processor which allows the display unit to sequentially display image data processed by the image processor with a predetermined time interval.

BRIEF DESCRIPTION OF THE DRAWINGS

Features, embodiments, and advantages of the present invention will become apparent from the following description, taken with reference to the accompanying drawings, in which:

FIG. 5 is a table showing specific values of time intervals in the bulb mode of the imaging device according to the first embodiment;

FIG. 11 is a table showing specific values of time intervals in the bulb mode of the imaging device according to the second embodiment;

FIG. 14 a table showing specific values of time intervals in the bulb mode of the imaging device according to the third embodiment;

DETAILED DESCRIPTION OF THE PREFERRED EMBODIMENTS

According to the present invention, a signal processing system is configured such that an image display process is independent from an image capturing process in a bulb mode in which image display is updated using the rolling shutter of the CMOS image sensor. This enables an image display with a gradual change in the exposure amount with a constant time interval even when the exposure amount abruptly changes in reality immediately after start of exposure. Accordingly, an operator is able to easily decide the right timing to complete the bulb exposure and reliably capture photo opportunity in the bulb shooting. Further, by setting a constant display update interval, an operator can easily estimate the timing at which exposure amount rises.

Furthermore, by use of the existing signal processing system, it is possible to update, with a constant interval, an image display with a pseudo increase in the exposure amount by repetitively amplifying a single image signal read during exposure. This makes it possible to smoothly update image display with a constant interval even when the exposure amount gradually increases, enabling an operator to decide an intended exposure level without a delay in bulb shooting.

Moreover, it can be configured that at start of exposure, image display is updated at a longer time interval with a gradual increase in the exposure amount irrespective of an abrupt increase in the actual exposure amount, and in a predetermined time after the start of exposure, it is updated at a shorter interval irrespective of a gradual increase in the actual exposure amount. Accordingly, this allows an operator to check an increase in the exposure at a constant time interval immediately after or several dozen seconds after the start of exposure in the bulb mode.

Further, the imaging device having a bulb mode preferably comprises a CMOS image sensor instead of a CCD image sensor. However, the present invention is also applicable to an imaging device including a CCD image sensor for capturing a subject such as a still life or scenery which does not include any moving objects and is not affected by the closing of the mechanical shutter during transfer periods.

Hereinafter, embodiments of the present invention will be described in detail with reference to the accompanying drawings.

Figure 1:
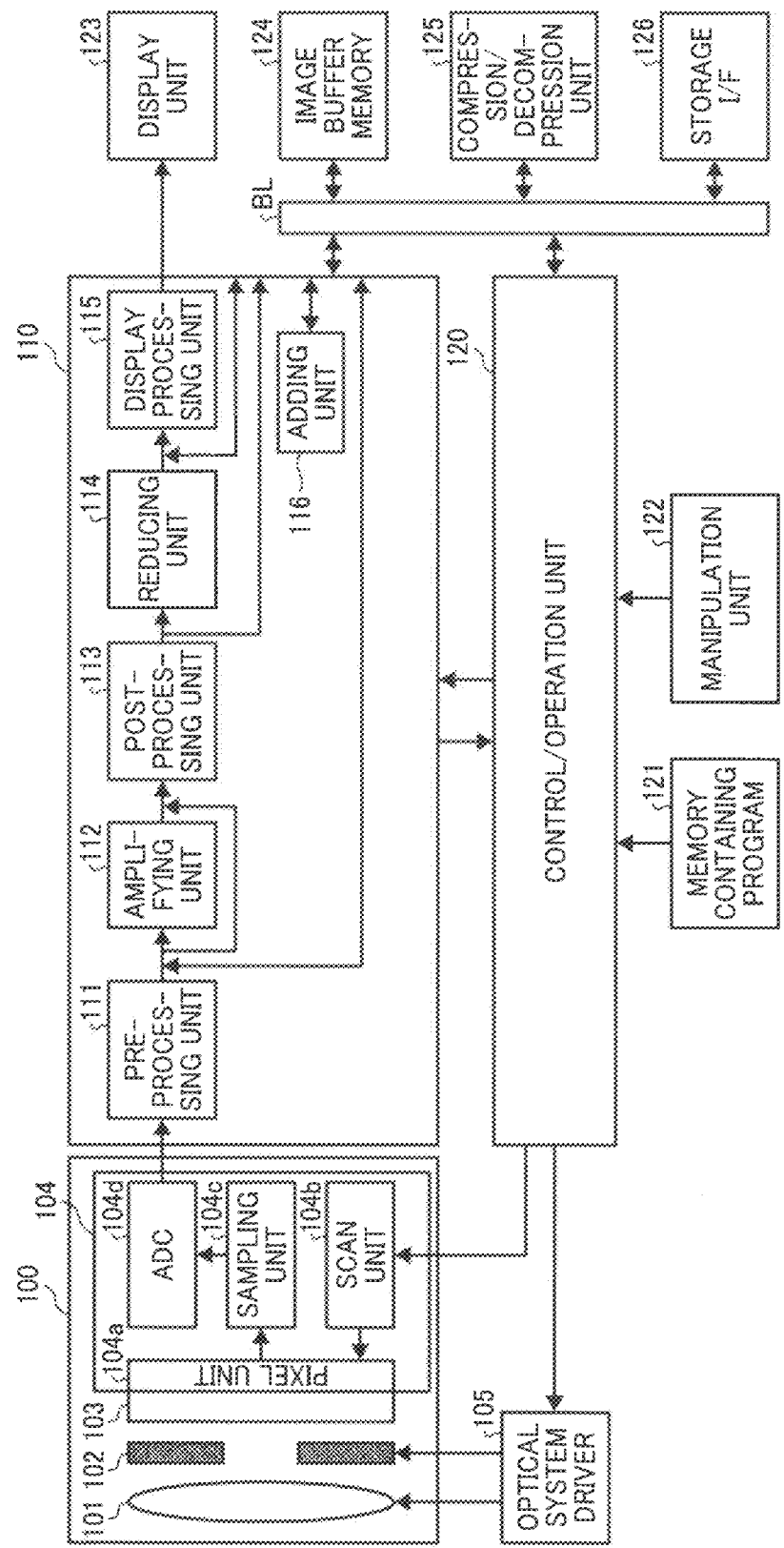
FIG. 1 schematically shows the essential parts of an imaging device according to first to third embodiments of the present invention.

FIG. 1 schematically shows the essential parts of an imaging device as a digital camera according to first to third embodiments of the present invention. In FIG. 1 the imaging device comprises an imaging unit 100, an optical system driver 105, an image processor 110, a control/operation unit 120, a memory 121 containing a program, a manipulation unit 122, a display unit 123, an image buffer memory 124, a compression/decompression unit 125, and a storage interface (hereinafter, storage I/F) 126. The imaging unit 100 comprises an optical system 101, a mechanical shutter 102, an optical filter 103, and a CMOS image sensor 104. The CMOS image sensor 104 comprises a pixel unit 104a, a scan unit 104b, a sampling unit 104c, and an AD converter (ADC) 104d. The image processor 110 comprises a pre-processing unit 111, an amplifying unit 112, a post-processing unit 113, a reducing unit 114, a display processing unit 115, and an adding unit 116. The image processor 110, control/operation unit 120, image buffer memory 124, compression/decompression unit 125 and storage I/F 126 are connected with each other via a bus line BL.

The optical system 101 is driven by the optical system driver 105 to perform focus adjustment and zooming. The mechanical shutter 102 is always open in the bulb mode according to the present invention since a shooting is made with a rolling shutter of the CMOS image sensor 104; however, it is closed in still image shooting at simultaneous exposure, in acquiring light-blocked image data, and at power-off.

In the CMOS image sensor 104, the scan unit 104b driven by the control/operation unit 120 scans the pixel unit 104a on which light-receiving pixels are arranged in matrix, the sampling unit 104c samples image signals from the pixel unit 104a, and the A/D converter 104d converts the image signals into digital signals for output. Outputs from the A/D converter 104d are processed by the image processor 110. In bulb shooting, for example, upon press onto a not-shown shutter button of the manipulation unit 122, the imaging device starts the bulb mode. The image signal read from the CMOS image sensor 104 is subjected to black level correction and defective pixel correction in the pre-processing unit 111 and then temporarily stored in the image buffer memory 124 via the bus line BL.

Next, the currently stored image signal and a previous added image based on previous image signals are read from the image buffer memory 124 and subjected to an adding processing by the adding unit 116 to create a new added image and store it in the image buffer memory 124. The latest added image is read from the image buffer memory 124 and subjected to post-processing including any of interpolation, white balance process, gamma conversion, color balance process, and edge enhancement by the post-processing unit 113, and stored in the image buffer memory 124 via the bus line BL. It is also sent to the following reducing unit 114. The amplifying unit 112 is bypassed in the first embodiment while it is used in signal processing according to a later-described second embodiment. The reducing unit 114 reduces the size of image data to one adapted to specification of the display unit 123 and stores it in the image buffer memory 124. Reduced image data is read from the image buffer memory 124 in accordance with display update timing, converted into a signal suitable for the display unit 123 by the display processing unit 115 and displayed on the display unit 123.

In storing process, a single item of image data is extracted from plural items of image data post-processed by the post-processing unit 113 and stored in the image buffer memory 124, compressed in JPEG format by the compression/decompression unit 125, and stored in a storage medium such as an SD card via the storage I/F 126. The control/operation unit 120 as an image reader properly controls the operations of the scan unit 104b of the CMOS image sensor 104, optical system driver 105, image processor 110 and the respective elements connected with the bus line BL according to a program in the memory 121, using data from the manipulation unit 122 and image processor 110 as well as data provided via the bus line BL.

First Embodiment

Figure 2:
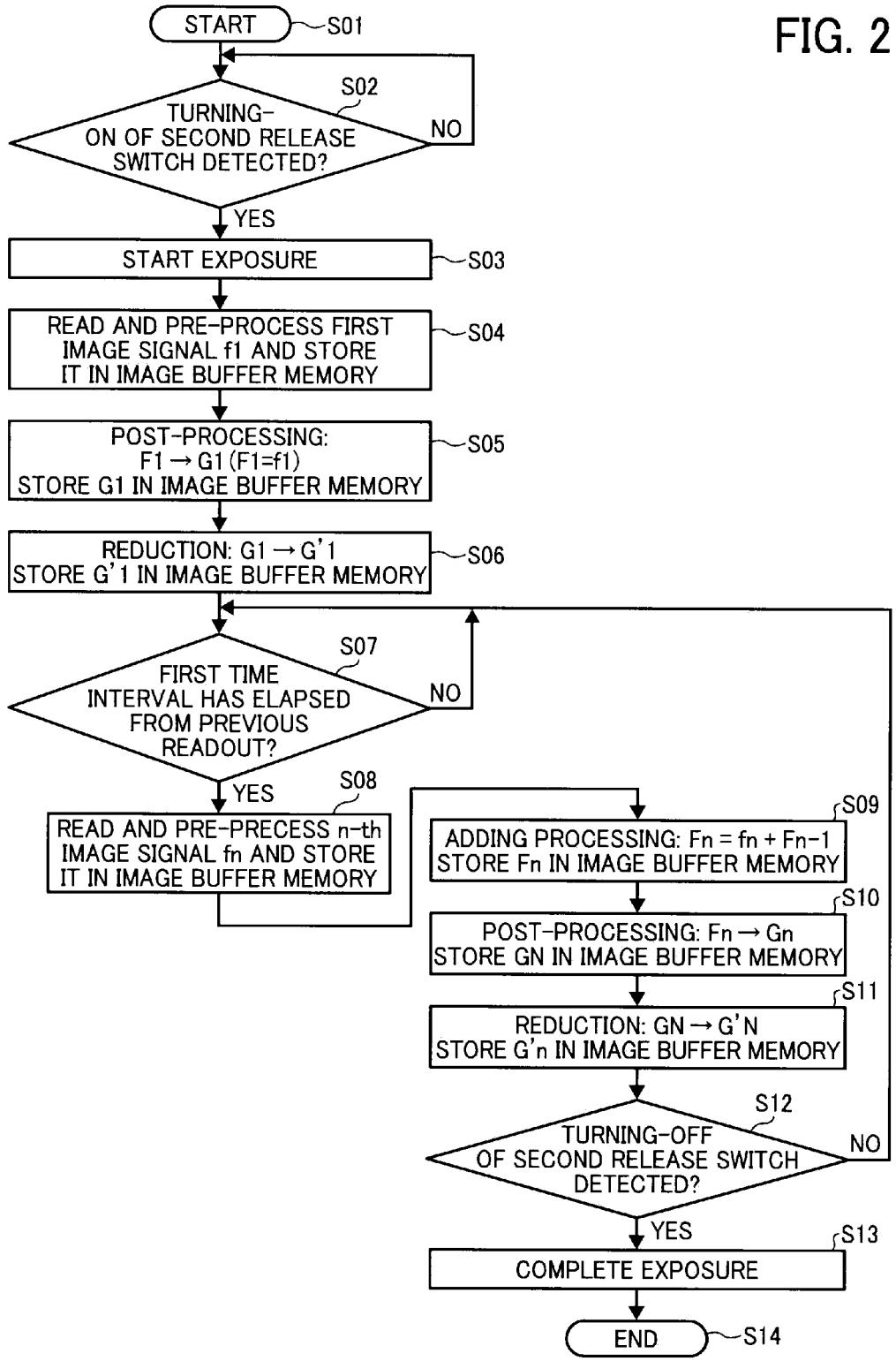
FIG. 2 is a flowchart for describing an imaging process in a bulb mode of the imaging device according to the first embodiment.
Figure 3:
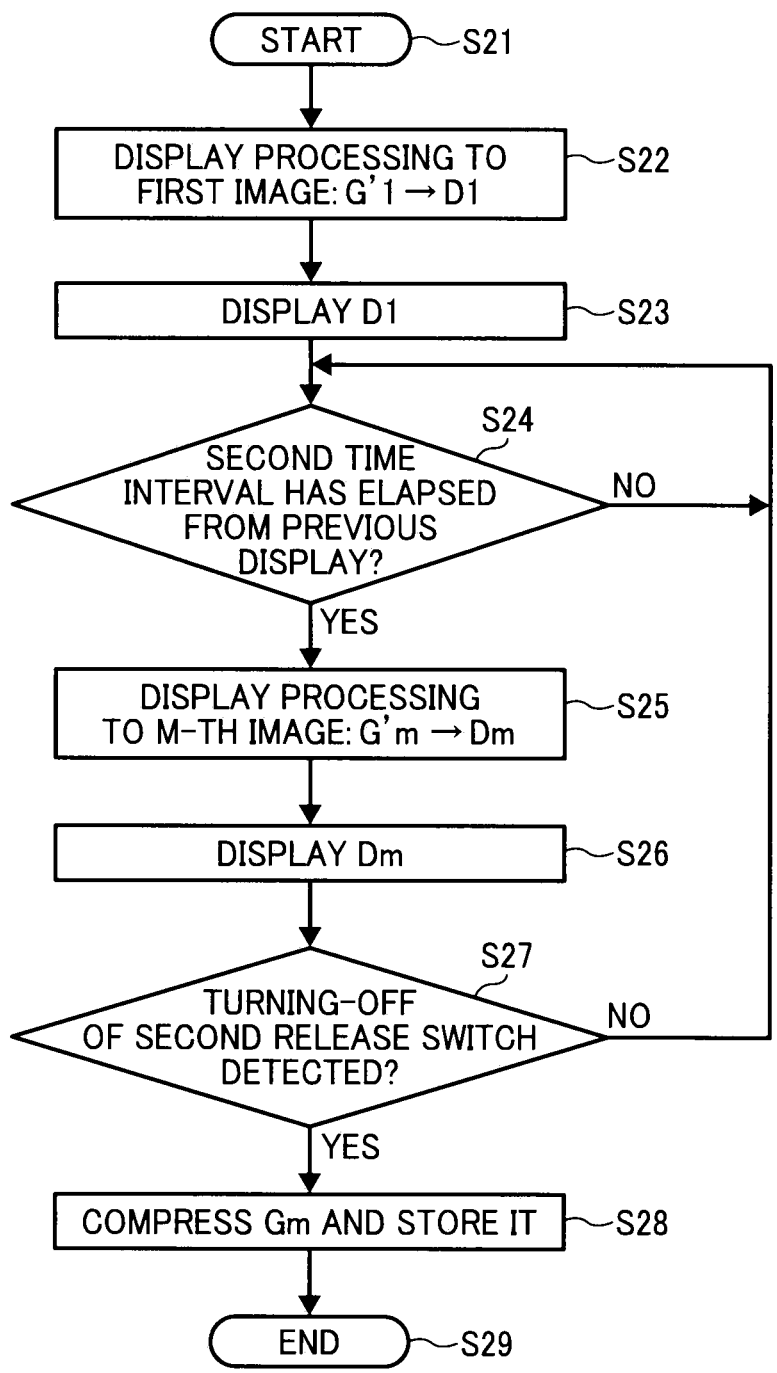
FIG. 3 is a flowchart for describing a display and storing process in the bulb mode of the imaging device according to the first embodiment.

A bulb shooting operation of the imaging device according to a first embodiment will be described with reference to FIGS. 2-3. FIG. 2 is a flowchart for shooting process (step S01 to S14) in the bulb mode while FIG. 3 is a flowchart for display and storing process (step S21 to S29). The imaging device comprises a two-stage (first and second) release switch which operates upon a half press and a full press to the shutter button (not shown) in the manipulation unit 122 and is configured to start bulb exposure upon the turning-on of the second release switch, continue the exposure during the on-state of the second release switch and complete the exposure upon turning-off of the second release switch in the bulb mode.

FIG. 2 shows an operation from readout of an image signal fn from the CMOS image sensor 104 to generation of a post-processed image Gn for storage and a reduced image G'n for display. In step S01 the operation starts. In step S02 a determination is made on whether or not turning-on of the second release switch is detected. Upon detection of the turning-on, exposure is started in step S03. Then, a first image signal f1 is read from the CMOS image sensor 104, subjected to pre-processing including black level correction and defective pixel correction in the pre-processing unit 111 to generate image data F1 and store it in the image buffer memory 124 via the bus line BL in step S04.

In step S05 the image data F1 is subjected to the post-processing including interpolation, white balance process, gamma conversion, color balance process, and edge enhancement by the post-processing unit 113. Post-processed image data G1 is then stored in the image buffer memory 124 via the bus line BL. In step S06 the image data G1 is reduced in size adapted to the specification of the display unit 123 by the reducing unit 114. The reduced image data is stored as display data G'1 in the image buffer memory 124 via the bus line BL. In step S07 a determination is made on whether or not a first time interval has elapsed from the previous readout. With the first time interval elapsed, an image signal fn (n being positive integer; second and subsequent image signals) is read from the CMOS image sensor 104, subjected to pre-processing by the pre-processing unit 111 to generate image data fn and store it in the image buffer memory 124 via the bus line BL in step S08. In step S09 the image data fn is subjected to adding processing by the adding unit 116 and added with the previous added image data Fn−1 to be added image data Fn (Fn=fn+Fn−1). The new added image data Fn is stored in the image buffer memory 124 via the bus line BL.

In step S10 the added image data Fn is subjected to the post-processing by the post-processing unit 113 to generate image data Gn and store it in the image buffer memory 124 via the bus line BL. In step S11 the image data Gn is subjected to the reducing processing by the reducing unit 114. The reduced image data is stored as display image data G'n in the image buffer memory 124 via the bus line BL. Then, in step S12 a determination is made on whether or not the turning-off of the second release switch is detected. Without the turning-off detected, the process goes back to step S07, stands by for elapse of the first time interval and repeats the above steps with the first time interval. By repeating the above steps, the added image data is accumulatively added to update the display image data G'n. Upon detection of turning-off of the second release switch in step S12, the exposure is completed in step S13, and the process ends in step S14.

Next, the flowchart in FIG. 3 shows a display update operation in which display image data G'n based on accumulatively added image data are sequentially displayed on the display unit 123 with a second time interval as well as a still image storing in accordance with an exposure determined. Accordingly, readout of first image data G'1 is pre-set to start after the step S06 in FIG. 2.

In step S21 the process starts. In step S22 first display image data G1' is read from the image buffer memory 124 via the bus line BL and converted into display data D1 in a signal form adapted to the specification of the display unit 123 by the display processing unit 115 in step S22. In step S23 the display data D1 is displayed on the display unit 123. Then, in step S24 a determination is made on whether or not the second time interval has elapsed from the previous display. When the interval has elapsed, the second and subsequent display image data G'm (m being positive integer) is read from the image buffer memory 124, and converted to display data Dm in a signal form adapted to the specification of the display unit 123 by the display processing unit 115 in step S25. In step S26 the display data Dm is displayed on the display unit 123.

In step S27 a determination is made on whether or not the turning-off of the second release switch is detected. With no detection determined, the process returns to step S24, waiting for the elapse of the second time interval, and the above steps are repeated with the second time interval. With the turning-off of the second release switch detected, accumulative added image data corresponding to current display image data G'm is read from the image buffer memory 124, compressed in JPEG form by the compression/decompression unit 125, and stored in a storage medium via the storage I/F 126 in step S28. The process ends in step S29.

Figure 4:
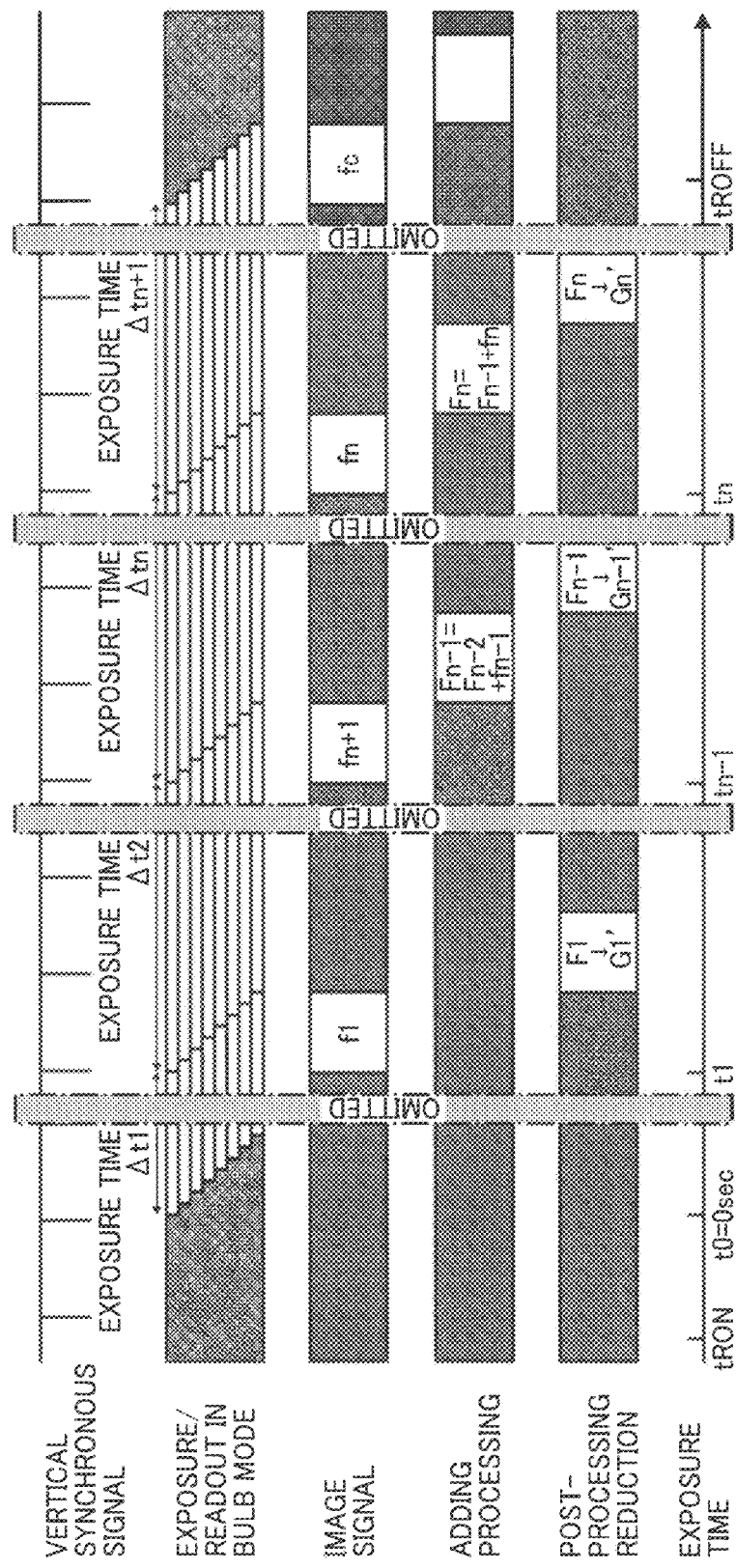
FIG. 4 is a timing chart for the imaging process in the bulb mode of the imaging device according to the first embodiment.

FIG. 4 is a timing chart of the operation in FIG. 2. In the drawing "vertical synchronous signal" and "exposure/readout in bulb mode" show operation timing of the CMOS image sensor 104. "exposure/readout in bulb mode" shows operation timing of the rolling shutter. As seen from the drawing, the rolling shutter can intermittently read image data in continuous exposure. "image signal" shows read timing of an image signal and pre-processing timing of the pre-processing unit 111 of the image processor 110. "adding processing" shows adding timing of the adding unit 116. "post processing/ reduction" shows post-processing timing and reduction timing of the post-processing unit 113 and the reducing unit 114, respectively. "tRON" on a time axis corresponds to detection timing for turning-on of the second release switch, and "tROF" corresponds to detection timing for turning-off of the second release switch. At time "t0=0 sec", exposure starts. Specific values of time t1 to tn are shown in FIG. 5.

FIG. 5 shows an example of values of the first and second time intervals when the range of exposure time is 1 second (t1) to 256 seconds (t25), exposure amount rises by ⅓Ev and display is updated every two seconds. To increase the exposure time by ⅓Ev, a relation, tk=1.26×tk−1 need be satisfied. The first time interval Δtk in FIG. 5 takes values calculated by Δtk=tk−(tk−1). The second time interval ΔT is fixed to 2 seconds in order to update image display every two seconds. Also, at t16=T16=32 sec., display update time catches up with the exposure time so that at t16 and thereafter, the same exposure image is displayed on the display at plural times. By setting the image display to update at 2 second interval as above, an operator can take time to decide the right shooting timing even during Δt2 to Δt7 in which exposure amount quickly rises at an interval of 1 second or less. Note that there is actually a time lag between exposure start time t0=0 sec. and display update time T0=0 sec. and between exposure time tn and display of the time Tm (tn=Tm). However, it is not considered here since it is irrelevant to the features of the present invention.

Figure 6B:
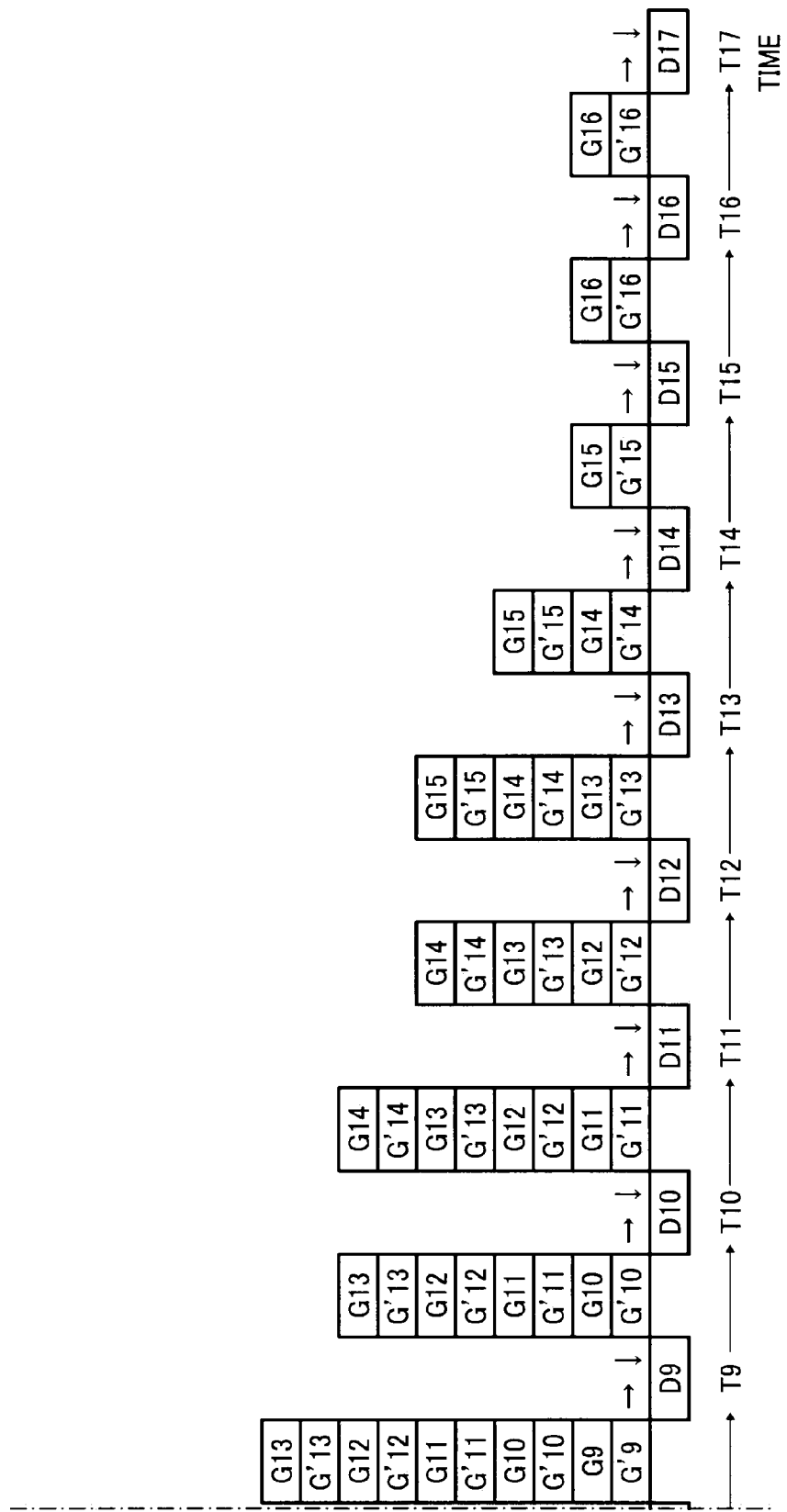
FIG. 6 shows the necessary number of image buffer memories and a change in the number of frames of image data in the bulb mode of the imaging device according to the first embodiment.

Four kinds of image data of the image signal f'n, added image Fn, post-processed image Gn, and reduced display image G'n are stored in the image buffer memory 124 according to the flowcharts in FIGS. 2, 3. In commercialization of an imaging device, memory capacity is limited due to cost efficiency so that unnecessary data need be overwritten or deleted. A single image signal f' and a single added signal F are enough for the signal processing according to the above flowcharts and the minimum necessary numbers of the post-processed images Gn and display images G'n depend on the first and second time intervals. In FIG. 6 the number of buffer memories for the images Gn, G'n and contents of stored images in the timing chart of FIG. 4 are shown, using display update time as a parameter.

In FIG. 6 display image data G'm is converted into display data Dm, and the post-processed image Gm and reduced image G'm are deleted after display of the next display data Dm+1 unless the second release switch is turned off. As shown in FIG. 6, the minimum necessary number of frames of image data of the post-processed image G and display image G' is 7. This is a relatively large number since the exposure image at time tn is also displayed at time Tm (tn=Tm).

Figure 7:
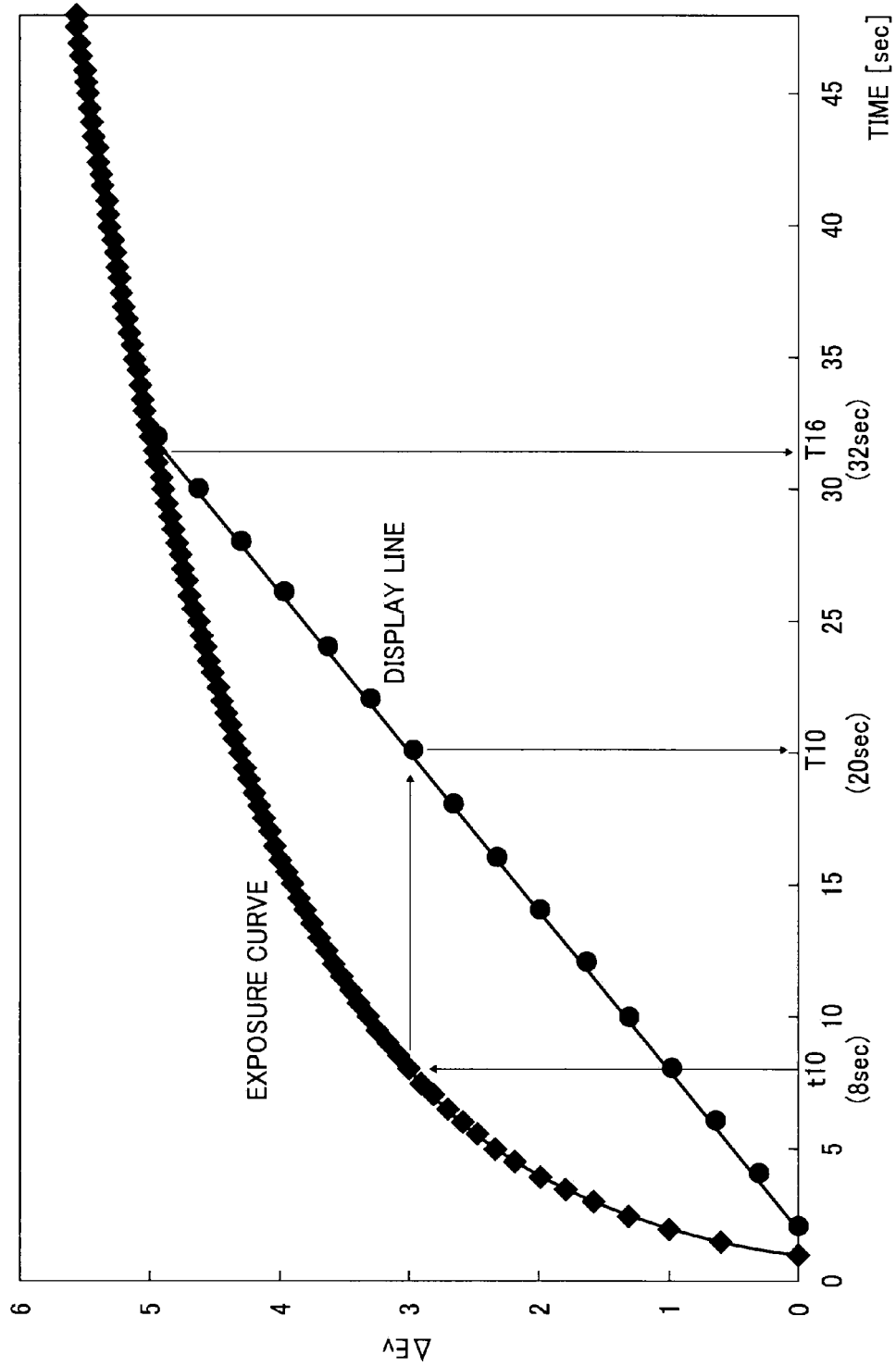
FIG. 7 is a graph showing a relation between an exposure and a preview display in the bulb mode of the imaging device according to the first embodiment.

FIG. 7 shows an exposure curve and a display line. The exposure curve represents a relation between exposure lapse time t and exposure amount Ev:

$$\Delta Ev = \log 10t / \log 102$$

The display line represents a relation, ΔEv=⅙*(t−2), in which image display is updated every two seconds. Note that both longitudinal and transverse axes in FIG. 7 are a linear scale.

In FIG. 7 an added image at t10 (8 seconds after start of shooting) is displayed on the display unit 123 at T10 (20 seconds after start of shooting). Likewise, there is a time lag between time t1 to t16 for the image capturing and time T1 and T16 for the image display so that the display shows the exposure amount rising at a constant rate (FIGS. 5-6).

Second Embodiment

The bulb mode of the imaging device according to a second embodiment will be described with reference to FIGS. 8-9.

Figure 8:
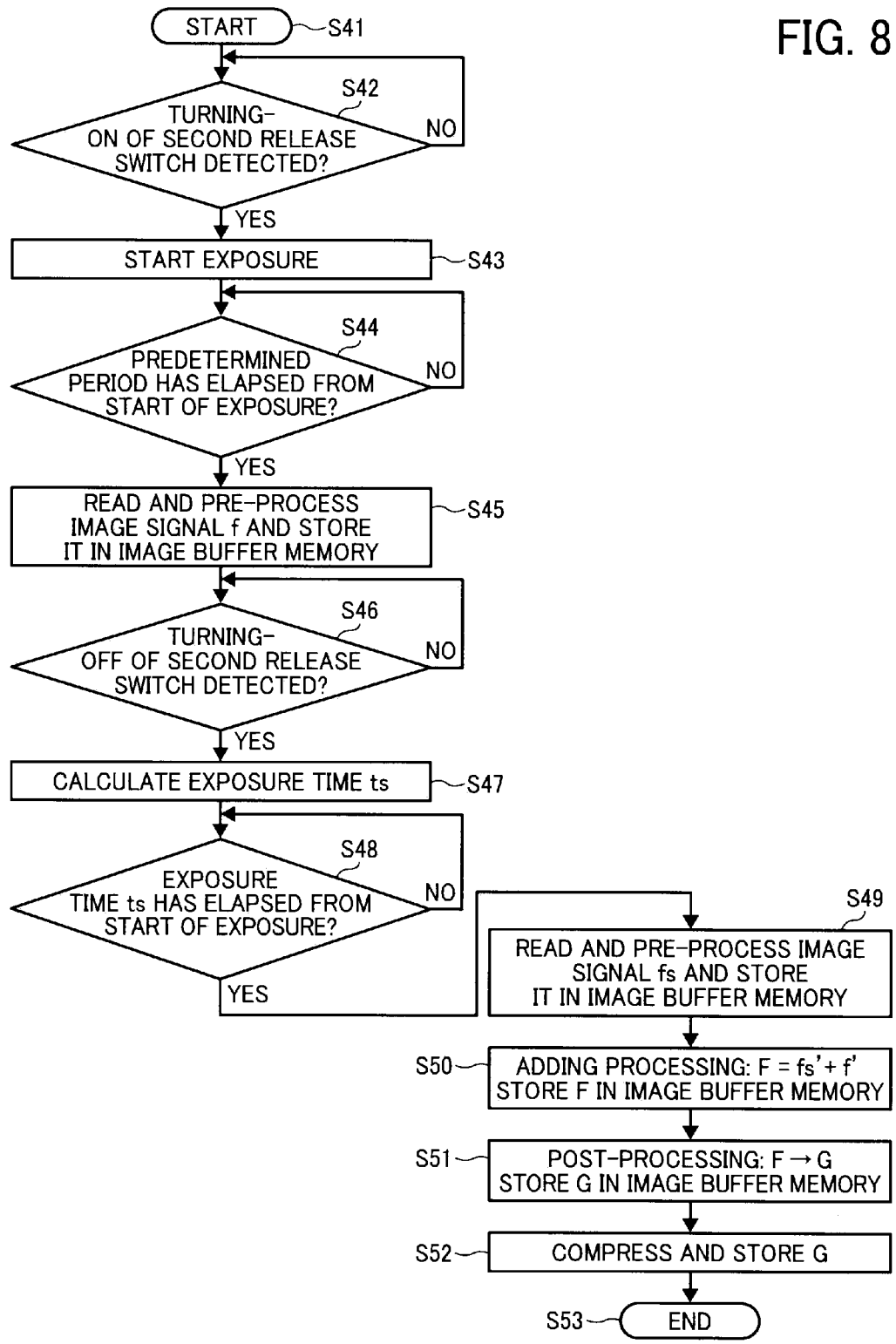
FIG. 8 is a flowchart for describing an imaging and storing process in the bulb mode of the imaging device according to the second embodiment of the present invention.
Figure 9:
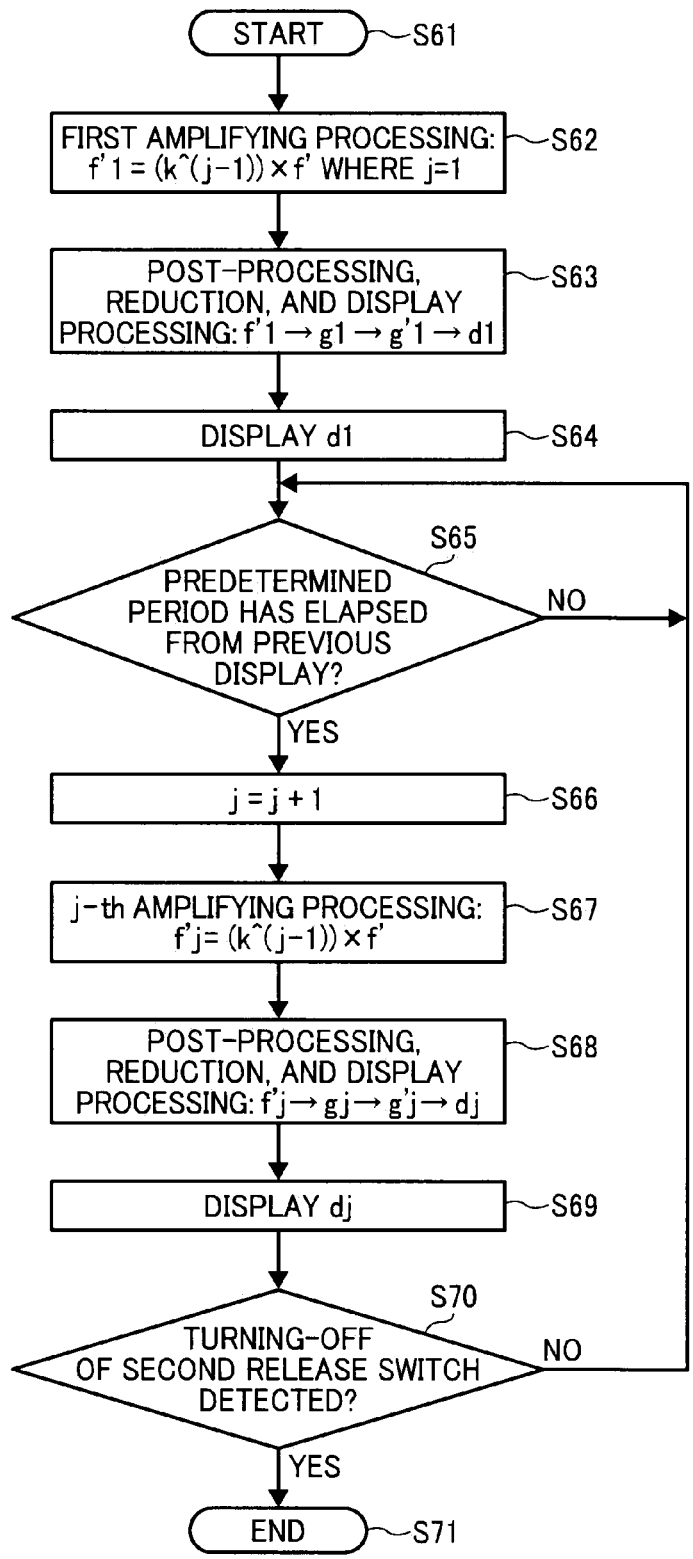
FIG. 9 is a flowchart for describing a display process in the bulb mode of the imaging device according to the second embodiment.

FIG. 8 is a flowchart for shooting and storing process (step S41 to S53) in the bulb mode while FIG. 9 is a flowchart for display process (step S61 to S71). As in the first embodiment, the two-stage release switch turns on upon a half press and a full press to the shutter button (not shown) in the manipulation unit 122 and is configured to start bulb exposure upon the turning-on of the second release switch, continues the exposure during the on-state of the second release switch and completes the exposure upon turning-off of the second release switch in the bulb mode.

FIG. 8 shows an operation from readout of an image signal f from the CMOS image sensor 104 to storing of a still image at an exposure decided. In step S41 the operation starts. In step S42 a determination is made on whether or not turning-on of the second release switch is detected. Upon detection of the second release switch's turning-on, exposure is started in step S43. In step S44 a determination is made on whether or not a predetermined period has elapsed. When the period has elapsed, the image signal f is read from the CMOS image sensor 104, subjected to pre-processing including black level processing and defective pixel correction in the pre-processing unit 111 to generate image data f', and stored in the image buffer memory 124 via the bus line BL in step S45.

The later-described operation shown in FIG. 9 is that the image data f' is amplified by the amplifying unit 112 of the image processor 110 and displayed on the display unit 123 with a second time interval, so that at every display update, a displayed exposure amount appears to rise.

Then, in step S46 a determination is made on whether or not turning-off of the second release switch is detected. With the turning-off detected, an exposure time ts is calculated in accordance with the exposure amount determined by the turning-off of the second release switch in step S47. A determination is made on whether or not the time ts has elapsed from the start of exposure in step S48. With the time ts elapsed, an image signal fs is read from the CMOS image sensor 104, subjected to pre-processing including black level processing and defective pixel correction in the pre-processing unit 111 to generate image data fs', and store it in the image buffer memory 124 via the bus line BL in step S49. In step S50 the image data fs' is added with the image data f' to be image data F (Fn=fs'+f'). In step S51 the added image data F is subjected to the post-processing by the post-processing unit 113 to be image data G and stored in the image buffer memory 124 via the bus line BL.

Then, the image data G is read from the image buffer memory 124, compressed in JPEG form by the compression/decompression unit 125, and stored in the storage medium via the storage I/F 126 in step S52. The operation ends in step S53.

The flowchart in FIG. 9 shows a display operation in which image display is updated with a second time interval. In step S61 the process starts. In step S62 image data f' is read from the image buffer memory 124 via the bus line BL and subjected to the first amplifying process by the amplifying unit 112 to generate image data f'1 (f'1=(k^(j−1))×f' where j=1) in step S62. Then, the image data f'1 is subjected to the post-processing by the post-processing unit 113 and the reduction by the reducing unit 114 and converted to a post-processed image g1 and then a reduced image g'1. Finally, the reduced image g1 is converted to display data d1 by the display processing unit 115 in step S63 (f'1 to g1 to g'1 to d1). In step S64 the display data d1 is displayed on the display unit 123.

Next, in step S65 a determination is made on whether or not the second time interval has elapsed from the previous display. With the interval elapsed, the coefficient j is incremented by 1 (j=j+1) in step S66. The image data f' is subjected to the amplifying process by the amplifying unit 112 to generate image data f'j (f'j=(k^(j−1))×f') in step S67. The image data f'j is subjected to the post-processing by the post-processing unit 113 and the reduction by the reducing unit 114, and converted to a post-processed image gj and a reduced image g'j. Further the reduced image g'j is converted to display data dj by the display processing unit 115 in step S68 (f'j to gj to g'j to dj). The display data dj is displayed on the display unit 123 in step S69.

In step S70 a determination is made on whether or not the turning-off the second release switch is detected. Without detection of the switch's turning-off, the process returns to step S65 and repeats the steps above with the second time interval until the turning-off of the second release switch is detected. With detection of the switch's turning-off in step S70, the operation ends in step S71.

According to the operation in FIGS. 8-9, after elapse of the predetermined period from the start of the bulb exposure in step S43, the image signal f is read and stored in the image buffer memory 124 in step S45. This image signal is repetitively amplified by the amplifying unit 112 of the image processor 110 with the second time interval in steps S66-S67 and displayed on the display unit 123 in steps S68-S69. Thus, a displayed image appears as if the exposure thereof continuously rises at every update. When the exposure amount is determined upon detection of the turning-off of the second release switch, the exposure time ts corresponding to the determined exposure is calculated in step S48. Then, after elapse of the exposure time ts in step S49, the image signal fs is read and added with the previously read image signal f', and stored in steps S50-S53. In the amplification in steps S62 and S67, "k" defines an amplification rate. At k being 1.26 (precisely, 1.259921), image data is amplified by every ⅓v for display. At k being 1.41 (precisely, 1.4142136), image data is amplified by every ½v for display.

Figure 10:
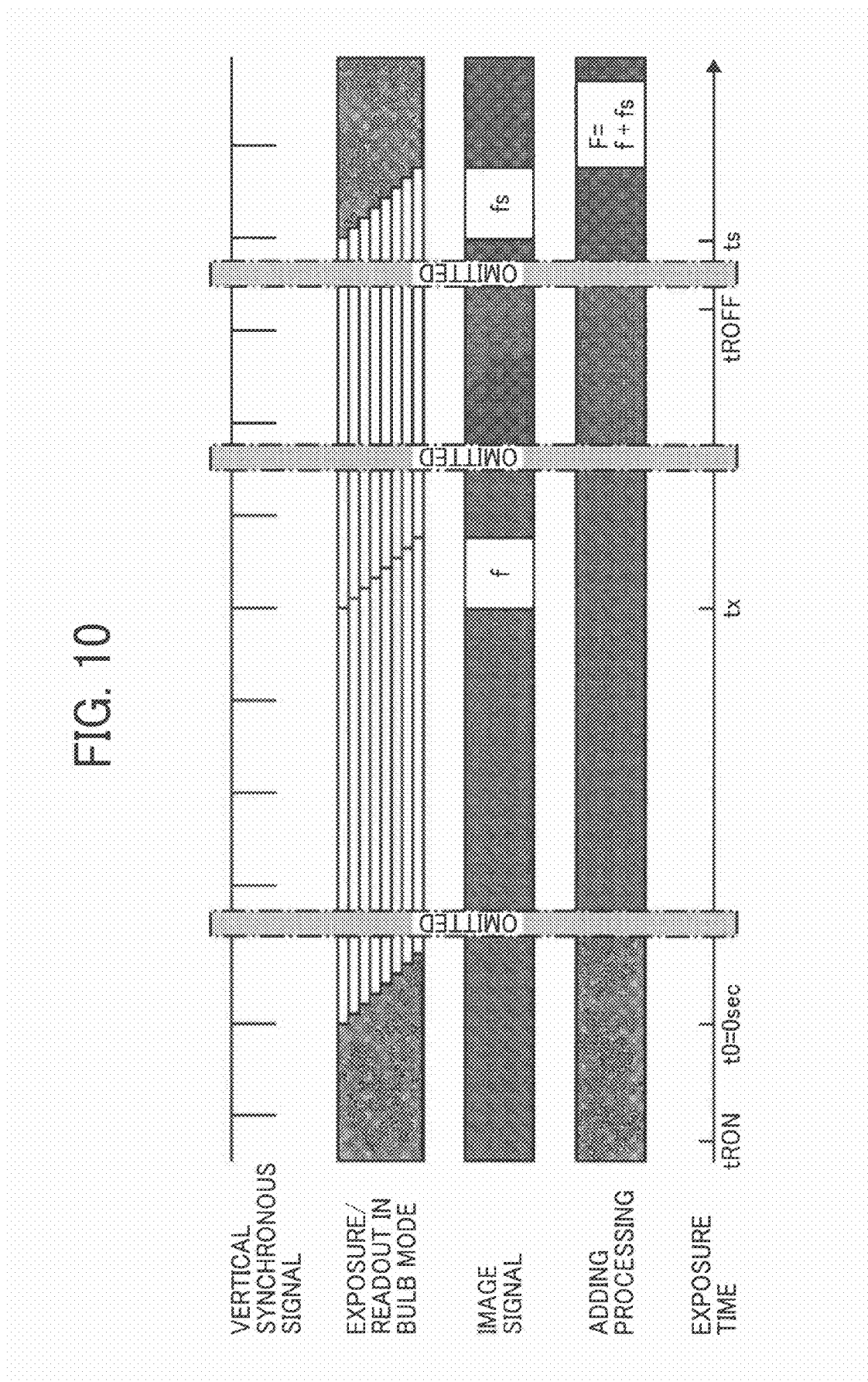
FIG. 10 is a timing chart for the imaging process in the bulb mode of the imaging device according to the second embodiment.

FIG. 10 is a timing chart of the operation in FIG. 8. In the drawing "vertical synchronous signal" and "exposure/readout in bulb mode" show operation timing of the CMOS image sensor 104. "Exposure/readout in bulb mode" shows operation timing of the rolling shutter. As seen from the drawing, the rolling shutter can intermittently read image data in continuous exposure. "image signal" shows operation timing of read of an image signal and timing of pre-processing of the pre-processing unit 111 of the image processor 110. "image adding processing" shows timing of adding process of the image adding unit 116. "post processing/reduction" shows timing of post processing and reduction of the post-processing unit 113 and the reducing unit 114. "tRON" on a time axis corresponds to detection timing for turning-on of the second release switch, and "tROF" corresponds to detection timing for turning-off of the second release switch.

At time "t0=0 sec", exposure starts. "tx" on the time axis indicates elapse of the predetermined period, and at time tx the image signal f is read and subjected to the pre-processing. Since only the image signal f is read, the mage display is updated using the image signal f without the adding process. When the second release switch is turned off at tROFF, the exposure time ts is calculated as in step S48 of FIG. 8, and the image signal fs is read at the exposure time ts, added, and stored.

Specific values of time t1 to tn according to the second embodiment are shown in FIG. 11, for example. FIG. 11 shows values of the first and second time intervals when the range of exposure time is 1 second (t1) to 256 seconds (t25), exposure amount rises by ⅓Ev and display is updated every two second. To increase the exposure time by ⅓Ev, a relation, tk=1.26×tk−1 need be satisfied. The first time interval Δtk in FIG. 11 takes values calculated by Δtk=tk−(tk−1). The second time interval ΔT is fixed to 2 seconds in order to update image display at 2 second interval. According to the present embodiment, the predetermined period is set to 8 seconds (t10) at which time taken for the exposure to rise by 1 Ev is longer than display update time. The predetermined period cannot be set too long since exposure image is not displayed until the predetermined period has elapsed, so that too long predetermined period may cause an operator to doubt a failure in the device. Further, when the predetermined period is too long, there is a possibility that the initial image f may be overexposed before amplified. On the other hand, when the predetermined period is too short, an error between an amplified image and an actual exposure image becomes large and the operator may not be able to acquire an intended exposure image. For this reason, instead of a fixed length of time, the predetermined period can be selectively determined by an operator's manipulation to the manipulation unit 122 (FIG. 1) according to a scene to be captured.

In the present embodiment, it is assumed that an operator's turning-off of the second release switch is detected at display update time T22 (32 sec.) In this case, an actual image f acquired at t10 (8 sec.) is amplified by 4 Ev and displayed on the screen so that an actual image the operator has intended to capture is an image at exposure time t22 (128 sec.). That is, the exposure time is 128 seconds, and an actual image is acquired with continuous exposure for a period of 96 (128−32=96) seconds from the detection of the turning-off of the second release switch.

Thus, for capturing a subject which needs a long exposure time of about 128 sec. (t22) to 256 sec. (t25), image display is started in 32 (T22) to 38 (T25) seconds after start of shooting. Because of this, the operator does not have to wait for a long time, keeping pressing the shutter button of the manipulation unit 122. Note that there is actually a time lag between exposure start time t0=0 sec. and display update time T0=0 and between exposure time tn and display of the time Tm (tn=Tm). However, it is not considered here since it is irrelevant to the features of the present invention.

Figure 12:
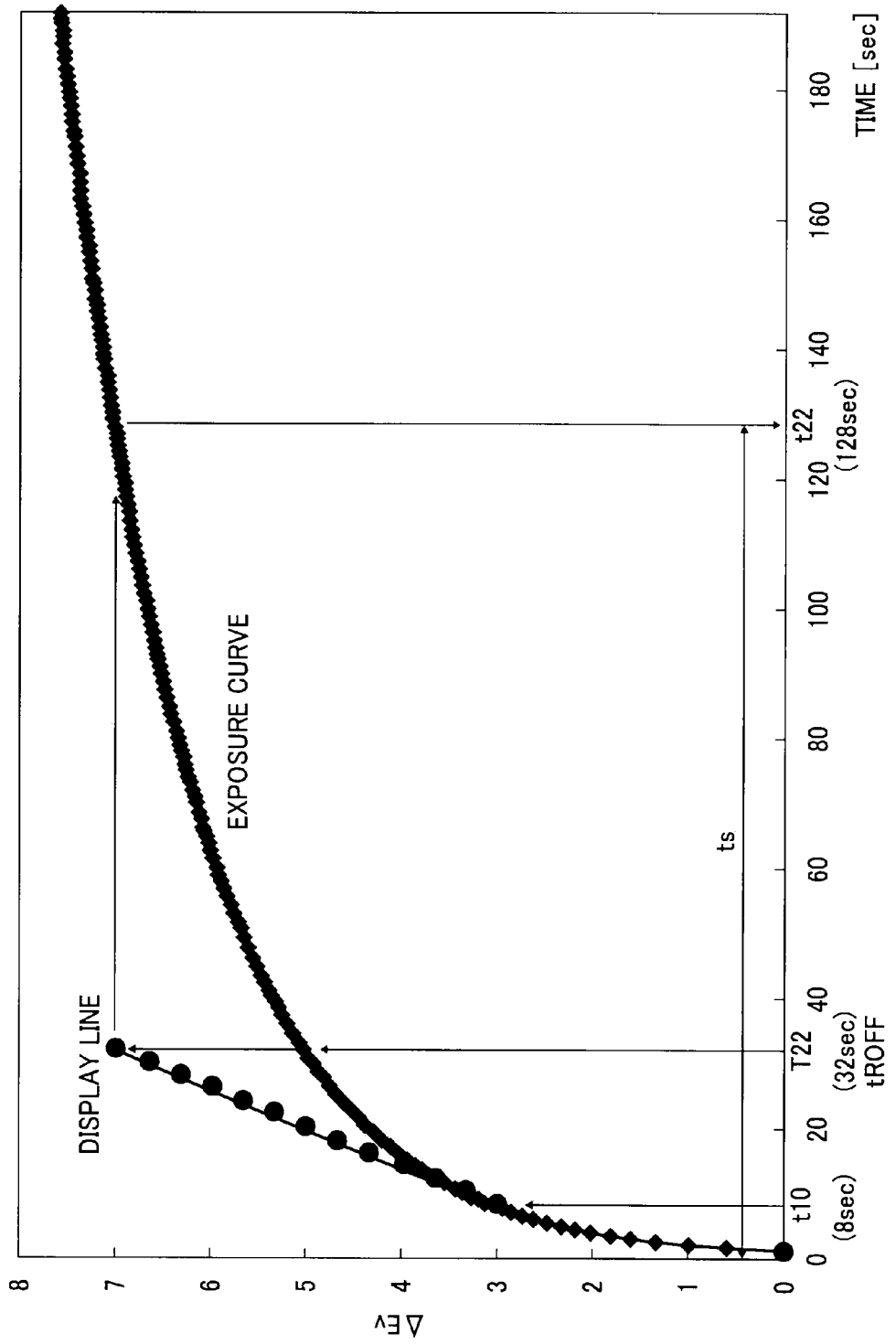
FIG. 12 is a graph showing a relation between an exposure and a preview display in the bulb mode of the imaging device according to the second embodiment.

FIG. 12 shows an exposure curve and a display line. The exposure curve represents a relation between exposure lapse time t and exposure amount Ev:

$$\Delta Ev = \log 10t / \log 102$$

The display line represents a relation, ΔEv=⅙*(t−8)+3, in which image display is updated every two seconds.

In FIG. 12 the display line starts rising at time t10 (predetermined period, 8 seconds from the start of exposure; Ev=3) at the intersection of the exposure curve and the display line, and at T22 (24 seconds from the start of exposure) it is inclined from +4 Ev and intersects with 7 Ev axis. An image with exposure 7 Ev which the operator intends to capture is one acquired at t22, or 128 seconds after the start of exposure so that the exposure time is in this case is from t0 to t22. The longitudinal and transverse axes of the graph are a linear scale.

As described above, exposure is continued even after the detection of turning-off of the second release switch, which causes the operator to keep waiting. It is therefore preferable to display on the display unit 123 such a message that "exposure continuing, please wait for 96 seconds", for example.

In the present embodiment, the necessary number of buffer memories is 4 for 4 kinds of image data of the image signal f, amplified (added) image f' (F), post-processed image g and reduced image g', respectively.

Third Embodiment

The bulb mode of the imaging device according to a third embodiment will be described with reference to a timing chart in FIG. 13.

The imaging device according to the third embodiment operates the same as in the first embodiment from start of the exposure to elapse of the predetermined period, and operates the same as in the second embodiment after the elapse of the predetermined period.

Figure 13:
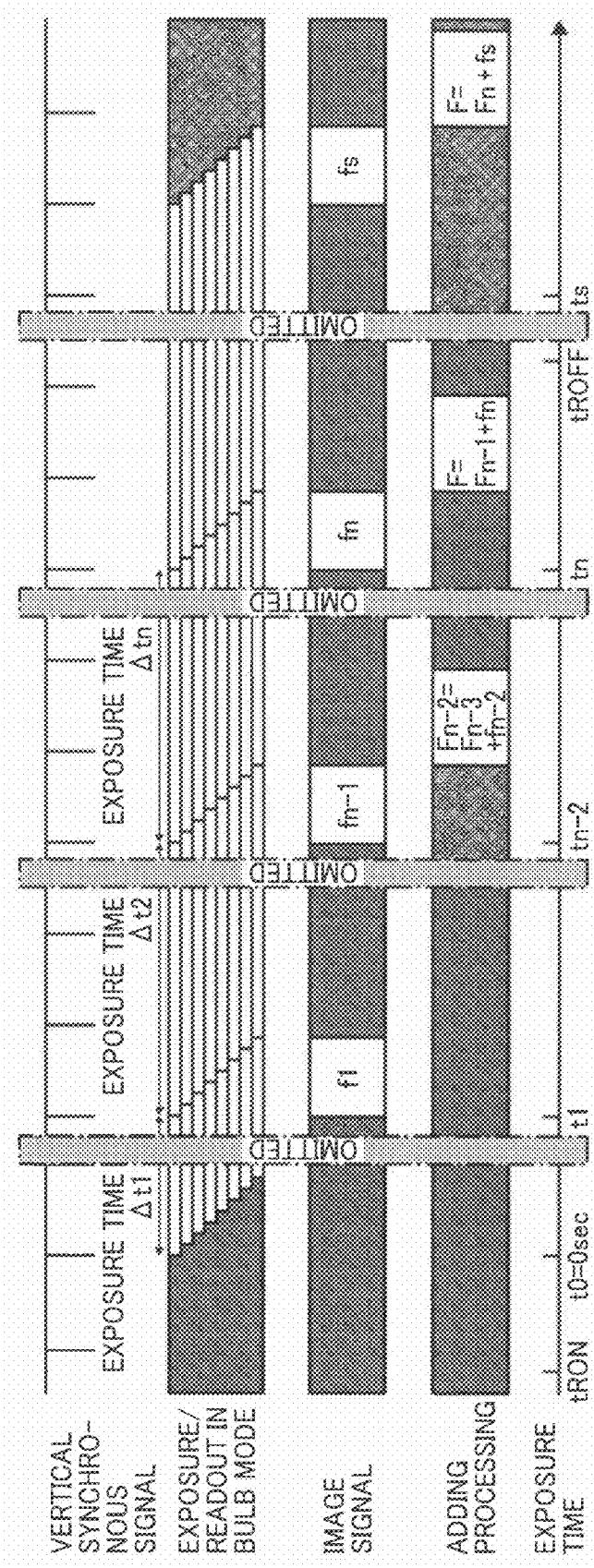
FIG. 13 is a timing chart for the imaging process in the bulb mode of the imaging device according to a third embodiment.

FIG. 13 is a timing chart of the operation according to the third embodiment. At instance when the predetermined period has elapsed from the start of the exposure, the image signals f1 to fn have been read. Using an added image Fn of the read image signals, image display is updated after the elapse of the predetermined period. After the turning-off of the second release switch, or time tROFF, operation is almost the same as that in FIG. 10.

FIG. 14 shows values of the first and second time intervals and the predetermined period when the range of exposure time is 1 second (t1) to 256 seconds (t5), exposure amount rises by ⅓Ev and display is updated every two second. To increase the exposure time by ⅓Ev, a relation, $tk=1.26 \times tk-1$ need be satisfied. The first time interval in FIG. 14 are values calculated by $\Delta tk=tk-(tk-1)$. The first and second time intervals $\Delta T$ are fixed to 2 seconds in order to update image display at 2 second interval. Also, at t16=T16=32 sec., display update time catches up with the exposure time so that the predetermined period is set to t16. The operation until t16 is done the same as that in the first embodiment and at and after t17, the operation is done the same as that in the second embodiment. Accordingly, in a period from T1 to T16, an image with an actual exposure is displayed while at and after T17 an image with a pseudo exposure, which is the added image F16 with an exposure amount at t16 and having been subjected to the amplification, is displayed.

The amplification and display update is performed by ⅓Ev in FIG. 14. This enables an operator to take time to decide the right shooting timing even during $\Delta t2$ to $\Delta t7$ in which exposure amount rises at a short interval of 1 second or less, since image display is updated at a longer interval of 2 seconds. Moreover, for capturing a subject which needs a long exposure time of about 128 sec. (t22) to 256 sec. (t25), image display is started in 44 (T22) to 50 (T25) seconds after start of shooting. Because of this, the operator does not have to wait for a long time, keeping pressing the shutter button.

In the present embodiment, it is assumed that an operator's turning-off of the second release switch is detected at display update time T22. In this case, an added image F16 (Ev=6) acquired at t16 is amplified by 2 Ev and displayed on the screen so that an actual image the operator intends to capture is an image acquired at exposure time t22 (128 sec.). That is, the exposure time is 128 seconds, and an actual image is acquired with continuous exposure for a period of 84 (128−44=84) seconds from the detection of the turning-off of the second release switch. Note that there is actually a time lag between exposure start time t0=0 sec. and display update time T0=0 and between exposure time tn and display of the time Tm (tn=Tm). However, it is not considered here since it is not the feature of the present invention.

Figure 15:
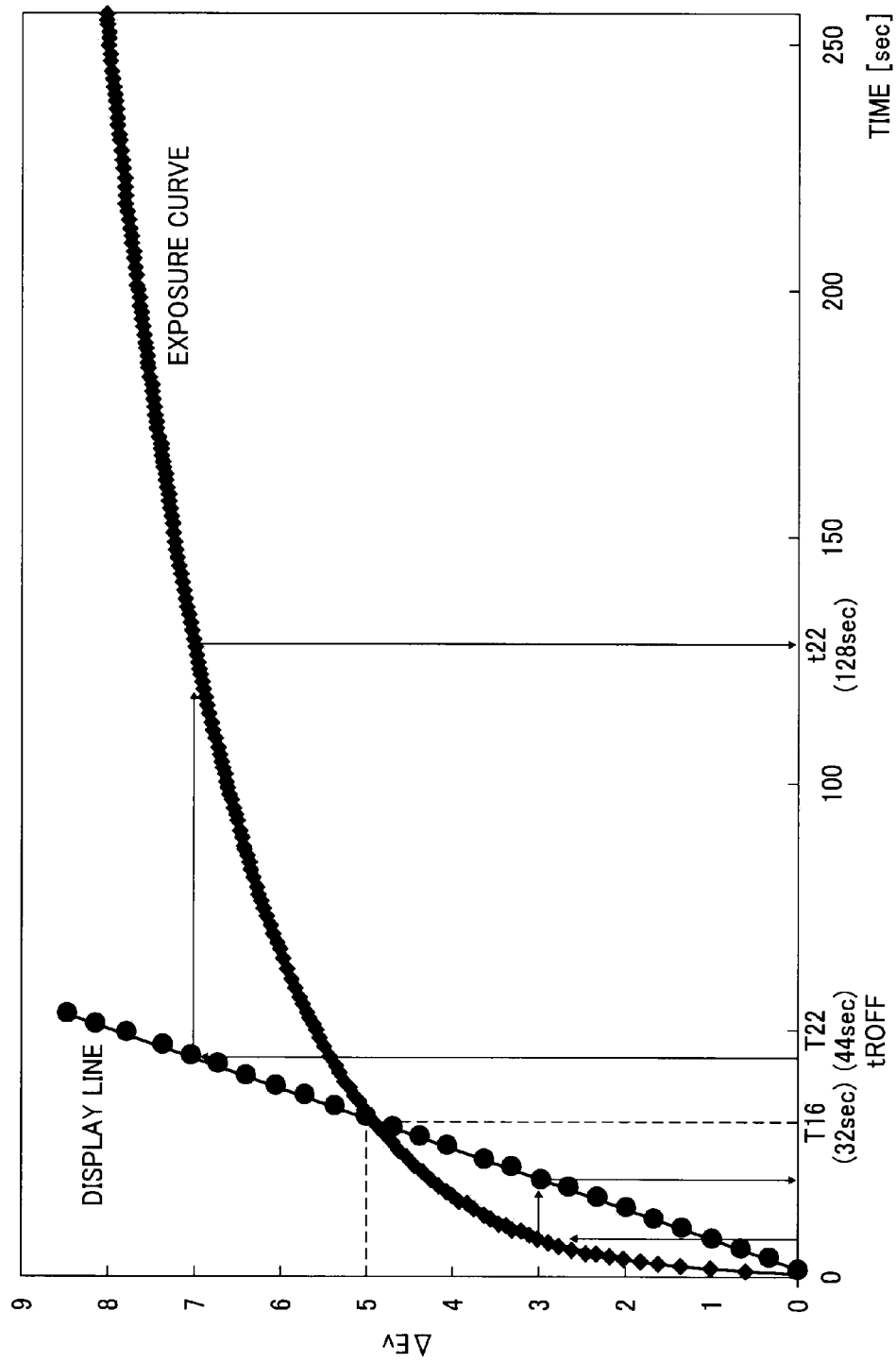
FIG. 15 a graph showing a relation between an exposure and a preview display in the bulb mode of the imaging device according to the third embodiment.

FIG. 15 shows an exposure curve and a display line. The exposure curve represents a relation between exposure lapse time t and exposure amount Ev:

$$\Delta Ev = \log 10t / \log 102$$

The display line represents a relation, $\Delta Ev = \frac{1}{6} \ast (t-2)$, in which image display is updated every two seconds.

In FIG. 15 the display line and the exposure curve intersect with each other at t=16 (32 sec.; T=16; Ev=5) at which the display update time catches up with the exposure time. The display line rises by 2 Ev at T22, 12 seconds after T16, and intersects with a 7 Ev axis. Note that the longitudinal and transverse axes of the graph are a linear scale.

Thus, display of an actual added image is updated every two seconds until T16 (predetermined period) so that exposure rises by ⅓ EV, and at and after T17 display of an amplified image on the basis of the added image acquired at T16 is updated so that exposure rises by ⅓ EV.

When the operator's turning-off of the second release switch is detected at T22 (44 sec.), an operator's desired image is assumed to be one with 7 Ev and exposure is continued until t22 (128 sec.), which keeps the operator waiting. It is therefore preferable to display on the display unit 123 such a message that "exposure continuing, please wait for 84 seconds", for example, as described in the second embodiment.

In the present embodiment the minimum necessary number of buffer memories 124 is 7 until T16 as in the first embodiment and it is 4 at and after T17 as in the second embodiment.

Figure 16:
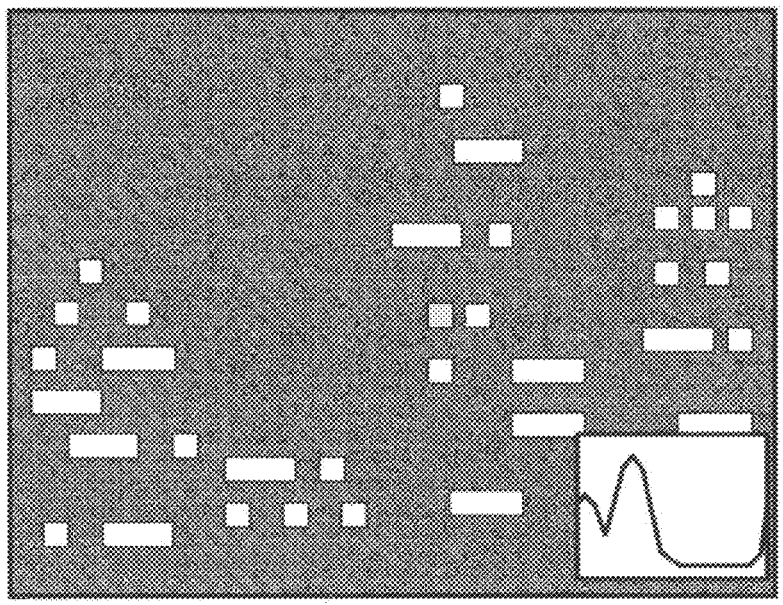
FIG. 16 shows an example of an image display of the imaging device according to the embodiments of the present invention.
Figure 17:
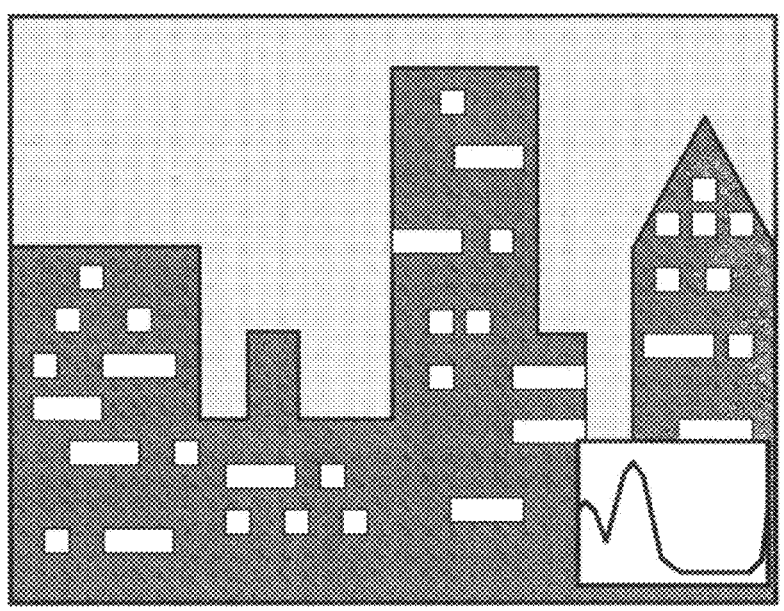
FIG. 17 shows the image display of FIG. 16 with a different exposure amount.

Next, FIGS. 16-17 schematically show an image captured by the imaging device according to any one of the first to third embodiments by way of example. The image is a nightscape image of urban high-rise buildings. The image in FIG. 16 is an example of a display image Dm−1 or dj−1 while that in FIG. 17 is an example of a display image Dm or dj.

In the first embodiment the exposure amount of the display image Dm added with the image signal fm in FIG. 17 is higher than that of the display image Dm−1 in FIG. 16. Likewise, in the second embodiment the exposure amount of the display image dj as the image signal amplified by k-times in FIG. 17 is higher than that of the display image dj−1 in FIG. 16.

Further, image histograms are shown in the lower right corners of FIGS. 16, 17. The longitudinal axes thereof are the number of pixels and the transverse axes are a brightness tone level of dark, medium, bright from the left side of the drawings. It is apparent from the drawings that a peak of darkness is in the left end of the histogram in the FIG. 16, however, it is shifted to the right side in that in FIG. 17, showing an increase in brightness.

As described above, according to the present invention, it is made possible to display preview images with a proper and gradual change in the exposure amount and allow an operator to easily take photo opportunity to shoot an image with proper exposure.

Although the present invention has been described in terms of exemplary embodiments, it is not limited thereto. It should be appreciated that fluctuations may be made in the embodiments described by persons skilled in the art without departing from the scope of the present invention as defined by the following claims.

What is claimed is:

1. An imaging device comprising:
   an optical imaging system;
   a solid-state image sensor which converts an optical image of a subject formed by the optical imaging system into an electric image signal;
   an exposure controller which starts an exposure in response to an instruction to start shooting;
   an image reader which sequentially reads, with a first time interval, image signals from the solid-state image sensor while the exposure controller continues the exposure, the first time interval being an interval with which an exposure amount rises by a certain amount;

an image processor which sequentially processes the image signals read by the image reader;

a display unit which displays a plurality of image data output from the image processor, each image data of the plurality of image data being associated with an image signal of the image signals and having a different exposure amount; and an image display processor which allows the display unit to update image display by sequentially displaying each image data of the plurality of image data processed by the image processor having the different exposure amount, with a second predetermined time interval that is a constant interval for each image data of the plurality of image data and that is different from the first time interval, and sequentially displaying, at a time when a display update time is equal to an exposure time and at times thereafter, image data with a same exposure amount.

2. The imaging device according to claim 1, wherein:

the image processor includes an adding function to sequentially add the image signals; and the image reader reads the image signals with the first time interval such that an exposure amount of image data having been subjected to the adding function rises by a same amount of time.

3. The imaging device according to claim 1, wherein the image processor includes an amplifying function to sequentially amplify the image signals; and the image display processor allows the display unit to sequentially display image data having been subjected to the amplifying function with the second predetermined time interval.

4. The imaging device according to claim 3, wherein the image display processor sets an amplification rate so that an exposure amount of the image data having been subjected to the amplifying function rises by a same amount of time.

5. The imaging device according to claim 1, wherein:

the image processor includes an adding function to sequentially add the image signals and an amplifying function to sequentially amplify the image signals; and the image display processor allows the display unit to sequentially display image data having been subjected to the adding function in a predetermined period after the start of the exposure and to display image data having been subjected to the amplifying function after an elapse of the predetermined period.

6. The imaging device according to claim 1, wherein the solid-state image sensor is a CMOS image sensor.

7. An imaging control method for a bulb shooting of an imaging device comprising an optical imaging system, a solid-state image sensor which converts an optical image of a subject formed by the optical imaging system into an electric image signal, an image processor which sequentially processes the image signals read from the solid-state image sensor, and a display unit which displays a plurality of image data output from the image processor, the method comprising the steps of:

starting an exposure in response to an instruction to start shooting;

sequentially reading, with a first time interval, image signals from the solid-state image sensor while the exposure is continued, the first time interval being an interval with which an exposure amount rises by a certain amount;

sequentially processing, by the image processor, the image signals read from the solid-state image sensor;

updating image display by displaying, on the display unit, the plurality of image data, each associated with an image signal of the image signals and having a different exposure amount, the updating sequentially displaying each image data of the plurality of image data having the different exposure amount with a second predetermined time interval that is a constant interval for each image data of the plurality of image data and that is different from the first time interval, and sequentially displaying, at a time when a display update time is equal to an exposure time and at times thereafter, image data with a same exposure amount; and ending the exposure according to an instruction to complete the shooting.

8. The image control method according to claim 7, further comprising the steps of:

sequentially adding the image signals by an adding function of the image processor; and sequentially reading the image signals with the first time interval such that an exposure amount of image data having been subjected to the adding function rises by a same amount of time.

9. The imaging control method according to claim 7, further comprising the steps of:

sequentially amplifying the image signals by an amplifying function of the image processor; and sequentially displaying, on the display unit, image data having been subjected to the amplifying function with the second predetermined time interval.

10. The imaging control method according to claim 9, further comprising the steps of setting an amplification rate so that an exposure amount of the image data having been subjected to the amplifying function rises by a same amount of exposure.

11. The imaging control method device according to claim 7, further comprising the steps of:

sequentially adding the image signals by an adding function of the image processor and sequentially amplifying the image signals by an amplifying function of the image processor; and sequentially displaying, on the display unit, image data having been subjected to the adding function in a predetermined period after the start of the exposure and displaying image data having been subjected to the amplifying function after an elapse of the predetermined period.

12. The imaging control method according to claim 7, wherein the solid-state image sensor is a CMOS image sensor.

13. The imaging device according to claim 1, wherein the second predetermined time interval is an interval of two seconds.

* * * * *